Figure 1:
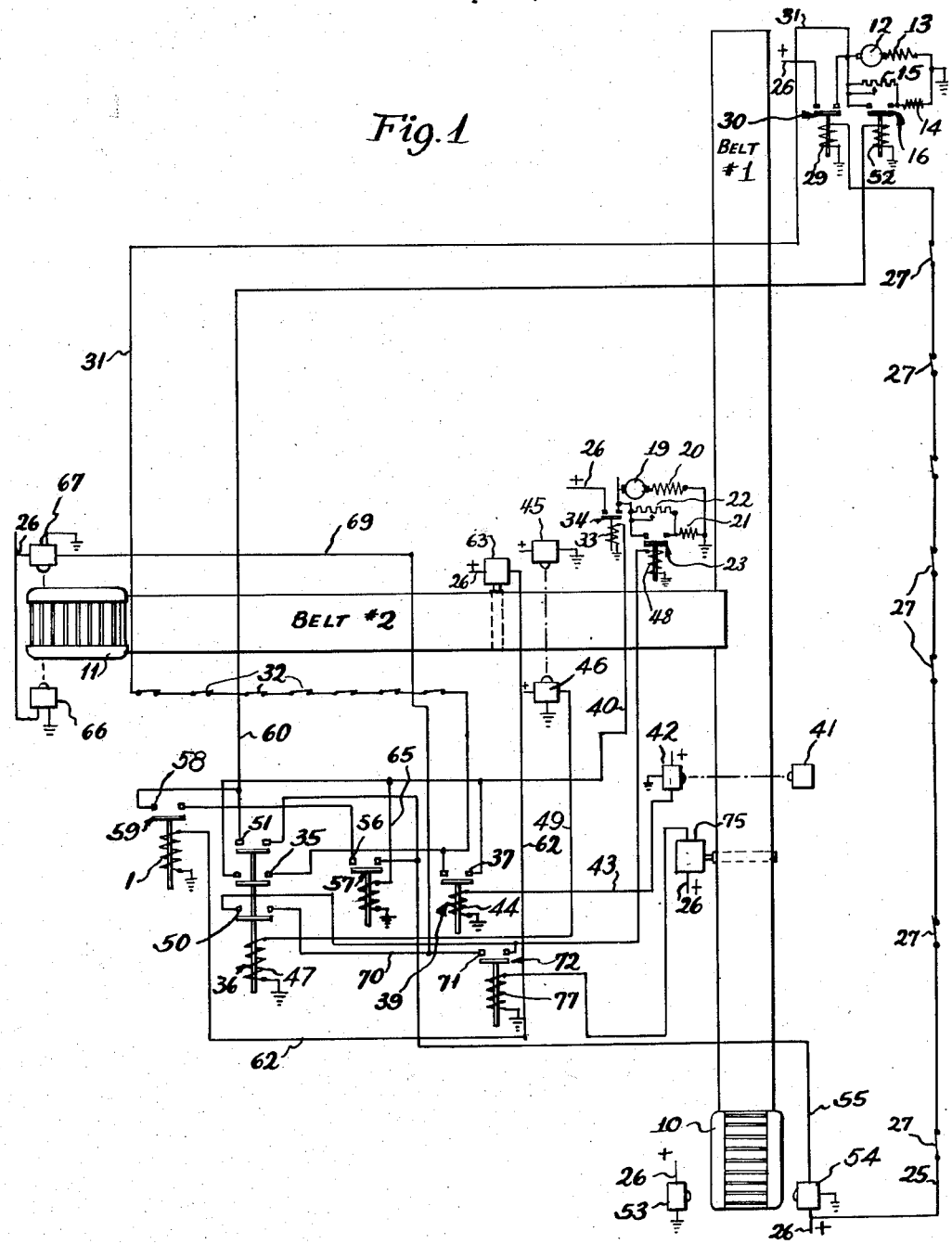

Nov. 13, 1951 C. O. WOOD 2,574,520
ELECTRICAL CONTROL SYSTEM
Filed Sept. 4, 1947

INVENTOR.
Claude O. Wood
BY
Clarence F. Poole
ATTORNEY

Patented Nov. 13, 1951

2,574,520

UNITED STATES PATENT OFFICE 2,574,520

ELECTRICAL CONTROL SYSTEM

Claude O. Wood, Chicago, Ill., assignor to Goodman Manufacturing Company, Chicago, Ill., a corporation of Illinois Application September 4, 1947, Serial No. 772,134

9 Claims. (Cl. 198—78)

This invention relates to improvements in electrical control systems and more particularly to an electrical control system for controlling operation of a plurality of related conveyors particularly adapted to transport coal in mines underground, one of which discharges into another.

The principal objects of my invention are to provide a new and improved control system for controlling operation of a plurality of conveyors during loading by material handling devices, such as shuttle cars, in mines underground, so arranged that the speeds of the conveyors increase while being loaded and drop to a lower speed as soon as loading ceases, to facilitate the conveying operation and reduce wear on the operating parts of the conveyor, together with means for stopping a loaded lateral conveyor from discharging onto a loaded main line conveyor and for again starting the lateral conveyor when the load on the main line conveyor has passed the transfer point from one conveyor to the other, to assure that the conveyors be either fully loaded or fully unloaded during operation and to prevent spillage of material at the discharge point of the lateral conveyor onto the main line conveyor and to prevent overloading of the main line conveyor.

This and other objects of my invention will appear from time to time as the following specification proceeds and with reference to the accompanying drawing which shows a wiring diagram illustrating one form in which my invention may be embodied.

In the drawing a main belt conveyor 1 is shown. Said conveyor may extend along a main entry of a mine, and may have a lateral belt conveyor 2 discharging onto it. While one lateral conveyor only is shown in the present drawing, it should be understood that any number of conveyors may discharge into the main line conveyor and that, in practice, a plurality of lateral conveyors usually discharge into the main line conveyor. Shuttle cars 10 and 11 are shown at the receiving ends of said main conveyor and said lateral conveyor, respectively, in discharge relation with respect thereto. Said shuttle cars may be of a well known form of self-propelled, power unloading vehicle usually loaded by a face loading machine and commonly used in mines to transport coal from the face to central loading stations, and are only herein shown insofar as is necessary to make my present invention readily understandable.

The main conveyor 1 is herein shown as being driven from an electric motor 12 having a series field 13, a shunt field 14, and a field resistance 15. Said field resistance is connected in series with said shunt field, upon opening of the contacts of a relay 16, to weaken the field strength of said shunt field and cause the speeds of said motor and main conveyor to increase an amount which may be predetermined by said resistance. In a like manner the lateral conveyor 2 is driven by an electric motor 19 having a series field 20, a shunt field 21, and a resistance 22 connected in series with said shunt field upon opening of the contacts of a relay 23, to increase the speed of said motor and lateral conveyor.

A control line 25 extending from a positive conductor 26 has a plurality of manually operated switches 27, 27 therein for opening the circuit to a coil 29 of a relay 30, to stop operation of the motor 12 and conveyor 1 from various points along the mine entry. Said motor and conveyor may also be started by closing said control switches. Said positive conductor 26 may be a main feeder connected to the various motors and control devices in the system and for the purposes of simplicity is not shown in its entirety, but only short portions thereof are shown as being connected to the various operating parts.

A control line 31 leads from the motor 12 and is connected with the positive conductor 26, when the relay 30 is closed, to supply power to start the motor 19 after the motor 12 has started. A plurality of control switches 32, 32 are provided in said control line, to stop operation of the motor 19 upon opening of any one of said switches from various points along the lateral or branch entry which has the lateral conveyor 2 therein. Said control line is adapted to supply power to energize a coil 33 of a relay 34, to close the contacts of said relay and start said motor 19. The connection from said control line to said coil includes contacts 35 of a relay 36, or contacts 37 of a relay 39 connected in parallel with said contacts 35, and a conductor 40 connected to said coil 33. The connections just described provide a parallel circuit to said coil 33 through either said contacts 35 or 37, to assure that the motor 19 starts and remains in operation when the conveyor 1 is cleared of coal and the conveyor 2 is loaded, and when the conveyor 2 is cleared of coal and the conveyor 1 is loaded, or when both conveyors are cleared of coal.

Operation of the relay 39 is controlled by coal on the main line conveyor adjacent the transfer point of coal from the lateral conveyor onto said main line conveyor, and is herein shown as being controlled by a photoelectric relay including a source of light 41 arranged to establish a light beam across said main line conveyor onto a photoelectric cell 42. A conductor 43 leading from said photoelectric cell is connected with a coil 44 of said relay and serves to energize said coil when a light beam is established on said cell. Said light source and photoelectric cell are positioned adjacent the transfer point of coal from the lateral conveyor onto said main conveyor, but are spaced from the inby end of this transfer point a distance slightly greater than the drift of a fully loaded belt after running at high speed. Said photoelectric relay may be of a well known form, with time delay features built into it both upon opening and closing to prevent changes in operation of said lateral conveyor when the light beam is broken by a man or by a lump of coal on said main line conveyor, or when a light beam is established by a gap in the coal on said main line conveyor. It is of course understood that said photoelectric relay may be replaced by mechanical switches and time delay relays of several well known types, operated by the coal traveling along the main conveyor 1. One switch which may be used is the Westinghouse HS–6 Hatchway limit switch connected with a time delay relay.

Operation of the relay 36 is controlled by coal passing along the lateral belt 2, adjacent the discharge end of said belt, by a photoelectric relay including a source of light 45 adapted to establish a beam of light on a photoelectric cell 46. Said source of light and photoelectric cell should be located inby of the transfer point of said lateral conveyor a distance slightly greater than the drift of a fully loaded belt when running at high speed. An operating coil 47 of said relay 36 is connected with said photoelectric cell 46 by a conductor 49, to energize said coil and close said relay when a light beam is established on said photoelectric cell 46. Said photoelectric relay may also be of a well known form having time delay features built into it both upon opening and closing, to prevent changes in operation of said main and lateral conveyors by the breaking of the light beam by a man, a gap in the coal on said lateral conveyor, or a single lump of coal on said lateral conveyor. Said photoelectric relay may also be replaced by a limit switch and time delay relay operated by the coal passing along said lateral conveyor. When said light beam is broken by coal on said lateral conveyor, contacts 35, 50 and 51 of said relay 36 will open. This will open one side of the parallel circuit to the coil 33 of the relay 34. It will also open one side of the parallel circuit to a coil 48 of the relay 23 and one side of a parallel circuit to a coil 52 of the relay 16.

A light source 53 at the receiving end or loading point of the conveyor 1 projects a beam thereacross onto a photoelectric cell 54 of a photoelectric relay, similar to the photoelectric relays previously mentioned and having time delay features built into it both upon opening and closing. It should again be understood that said relay may be replaced by a switch and time delay relay operated by movement of the shuttle car 10 to a discharge position with respect to said main conveyor, if desired. A conductor 55 leading from said photoelectric cell is energized by current from the positive conductor 26, when a light beam is established on said cell, and is deenergized when said light beam is broken. The conductor 55 is connected with contacts 56 of a relay 57, contacts 58 of a relay 59, and a conductor 60 leading to the coil 52 of the relay 16, for energizing said coil and closing said relay when the contacts 56 and 58 are closed. Said conductor 55 is also connected with contacts 51 of the relay 36, in parallel with said contacts 56 and 58 of said relays 57 and 59 respectively. When the light beam established on the photoelectric cell 54 is broken or when the contacts 56 and 58 and 51 are open, the relay 16 will open and the resistance 15 will be placed in series with the shunt field 14, to weaken said field and accelerate the speed of the motor 12.

The relay 59 is operated by a coil 61 energized by a conductor 62 leading from a roller switch 63. Said roller switch is positioned to be operated by the conveyor 2 and may be of a well known form of magnetically operated or fluid coupling type roller switch and is no part of my present invention so is not herein shown nor described in detail. Said switch is so arranged that its contacts will be closed when said conveyor 2 operates at a normal slow speed and will open when said conveyor attains a predetermined high speed, and is provided to accelerate the speed of the main line conveyor, when the lateral conveyor is traveling at a high speed and is loaded.

Operation of the relay 57 is controlled by a coil 64 connected with the conductor 40 through a conductor 65. Said coil is energized to close said relay when the motor 19 is running and either the contacts 35 of the relay 36 or the contacts 37 of the relay 39 are closed.

A photoelectric relay including a source of light 66 establishing a light beam across the lateral conveyor 2, at its receiving end or loading point, onto a photoelectric cell 67, is provided to accelerate the speed of said lateral conveyor from a normal speed when the shuttle car 11 moves into position to load coal thereon and the light beam established on said photoelectric cell is broken. Said photoelectric relay like the photoelectric relays previously mentioned, has time delay features built into it both upon opening and closing, and may also be replaced by a mechanically operated electric switch and a time delay relay operated by movement of the shuttle car to a discharge position if desired. A conductor 69 leading from said photoelectric cell is connected to a conductor 70 connected between the contacts 50 of the relay 36 and contacts 71 of a relay 72. Said contacts are connected in parallel and either one or both of said contacts may serve to supply current to energize the coil 48 of the relay 23, to close said relay and cut the resistance 22 out of the circuit to the shunt field 21, and cause the motor 19 and lateral belt conveyor 2 to operate at a normal slow speed when a light beam is established on said photoelectric cell.

A roller switch 75 driven by the main line conveyor 1, is provided to energize a coil 77 of the relay 72 and close said relay when said main line conveyor is traveling at a normal slow speed. Said roller switch is like the roller switch 63 and its contacts are closed when the main line conveyor is stopped and operating at a low normal speed and open when said main line conveyor accelerates to a higher loading speed. The purpose of this roller switch is to accelerate the speed of the lateral conveyor to that of the main line conveyor when the lateral conveyor is loaded at its transfer point and the main line conveyor is running at a high speed.

When the conveyors 1 and 2 are empty and the shuttle cars 10 and 11 have moved away from said conveyors, to permit light beams to be established on the photoelectric cells 54 and 67, respectively, and the control switches 27 and 32 are closed, the hereinbefore mentioned relays will all be closed and the main line and lateral conveyors will operate at normal slow speeds, the lateral conveyor starting after the main line conveyor, as has been previously mentioned.

When a light beam established on the photoelectric cell 54 is broken by a shuttle car moving into position to discharge its load onto the conveyor 1, the flow of current through the conductor 55 will be cut off. This will deenergize the coil 52 of the relay 16 and will cause said relay to open and cut the resistance 15 in series with the shunt field 14 and accelerate the speed of the motor 12 and main conveyor 1 to a predetermined high speed after a predetermined time delay interval.

In a like manner, when the shuttle car 11 breaks a light beam established on the photoelectric cell 67, the flow of current through conductor 69 will be cut off after a predetermined time delay interval. This will deenergize the coil 48 of the relay 23 and will cause said relay to open and cut the resistance 22 in series with the shunt field 21 and accelerate the speed of the motor 19 and lateral conveyor 2 to a predetermined high speed.

When the main conveyor 1 is carrying coal at a high speed adjacent the transfer point of coal from the lateral conveyor 2 onto said main conveyor and the lateral conveyor is loaded, the light beam established on the photoelectric cell 42 will be broken. This will deenergize the coil 44 of the relay 39 and will cause said relay to open. Coal on the lateral conveyor 2 will also break the light beam established onto the photoelectric cell 46. This will deenergize the coil 47 of the relay 36 and open the contacts of said relay. Opening of the contacts of said relays 36 and 39 will break the circuit to the coil 33 of the relay 34 and will cause the contacts of said relay to open and stop the motor 19. As soon as coal on the main conveyor 1 passes said transfer point, a light beam will be established on the photoelectric cell 42 to energize the coil 44 of the relay 39 and close said relay. Closing of said relay will again complete a circuit to the coil 33 of the relay 34, to close said relay and start the motor 19 and lateral belt conveyor 2.

Since the light beam established on the photoelectric cell 46 will still be broken by coal on the lateral conveyor, the relay 36 will remain open. Also since the main line conveyor is traveling at a high speed, the relay 72 will be open. Said relays 36 and 72 being open the circuit to the coil 48 of the relay 23 will be open and said relay will remain open. Said lateral and main conveyors will then travel at high rates of speed until light beams are established onto the photoelectric cells 54, 67 and 46, at which time the main line conveyor will slow down to a normal slow speed. At the same time the contacts of the roller switch 75 will close, closing the relays 72 and 23 and cutting the resistance 22 out of the shunt field 21 of the motor 19 to cause said lateral conveyor to slow down to the speed of said main line conveyor.

When the main line conveyor 1 is carrying coal at a slow speed at the transfer point of coal from the lateral conveyor 2, and coal approaches this transfer point on said lateral conveyor at a slow speed, the light beam established on the photoelectric cell 42 will be broken and the relay 39 will open. The light beam established on the photoelectric cell 46 will also be broken and the relay 36 will open. This will break the circuit to the coil 33 of the relay 34 and stop the belt conveyor 2. Since the conductor 40 will be dead, the contacts 56 of the relay 57 will open. Since the contacts 51 of said relay 36 open upon opening of said relay and since the contacts 56 of the relay 57 are also open, the circuit to the coil 52 of the relay 16 will be broken and said relay will open to accelerate said belt conveyor 1 to a high speed in order to hold the stopped time of the belt 2 to a minimum.

As soon as coal on the main line conveyor passes the transfer point, a beam will be established on the photoelectric cell 42, to close the relay 39 in a predetermined time interval. This will complete a circuit to the coil 33 of the relay 34. Said relay will then close and said lateral conveyor 2 will start and travel at a normal slow speed. Starting of said lateral conveyor will energize the coil 64 of the relay 57 and close said relay. The contacts of the roller switch 63 will also be closed and the coil 61 of the relay 59 will be energized, to close said relay. This will complete a circuit to the coil 52 of the relay 16 and will close said relay and cause the motor 12 and conveyor 1 to travel at a normal speed.

When the main conveyor 1 is carrying coal at a high speed or a low speed and no coal is on the lateral conveyor 2 at the transfer point, the conveyor 1 will continue to travel at the same rate of speed as formerly, while the lateral conveyor 2 will also travel at the same rate of speed as formerly without interruption, even though the relay 39 opens. Under these circumstances the light beam on the photoelectric cell 46 will be established and the relay 36 will be closed to establish a parallel circuit to the coil 33 of the relay 34 and hold said relay closed.

When the main conveyor 1 is traveling at a slow speed and is not loaded at the transfer point and coal approaches at a high speed on the lateral conveyor 2, the light beam established on the photoelectric cell 46 will be broken and the relay 36 will open. This will open one side of a parallel circuit to the coil 52 of the relay 16. The contacts of the roller switch 63 will also open and break the circuit to the coil 61 of the relay 59. This will open said relay and the circuit to the coil 52 of the field control relay 16. Said relay 16 will then open and the speed of the main conveyor 1 will accelerate to the speed of travel of the lateral conveyor 2 until coal on said lateral conveyor has passed the transfer point, at which time a light beam will again be established on the photoelectric cell 46, closing the relay 36 and energizing the coil 52 of the relay 16, to close said relay. This will cause the main conveyor 1 to again slow down to its normal rate of speed.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a control system for a plurality of conveyors for fragmented material or the like, a main line conveyor and a lateral conveyor discharging into said main line conveyor, a motor for driving said main line conveyor, a motor for driving said lateral conveyor, a main line conveyor relay for controlling the starting of said main line conveyor motor, a lateral conveyor relay for controlling the starting of said lateral conveyor motor, a control circuit including said lateral conveyor relay for starting said lateral conveyor after said main line conveyor has been started, separate electric switching means associated one each with said main line and lateral conveyors in circuit with said control circuit and controlled by movement of fragmented material along said main line and lateral conveyors adjacent the transfer point from said lateral conveyor onto said main line conveyor, for stopping said lateral conveyor when both of said conveyors are loaded with fragmented material and fragmented material is approaching said transfer point, said switching means associated with said lateral conveyor being connected in a circuit for weakening the field of said main line conveyor motor to increase the speed thereof when said main line conveyor is loaded adjacent said transfer point and said lateral conveyor has been stopped by operation of both of said switching means.

2. In a control system for a plurality of conveyors for fragmented material or the like, a main line conveyor and a lateral conveyor discharging into said main line conveyor, a motor for driving said main line conveyor, a motor for driving said lateral conveyor, a main line conveyor relay for controlling the starting of said main line conveyor motor, a lateral conveyor relay for controlling the starting of said lateral conveyor motor, a control circuit including said lateral conveyor relay for starting said lateral conveyor after said main line conveyor has been started, separate electric switching means associated one each with said main line and lateral conveyors in circuit with said control circuit and controlled by movement of fragmented material along said main line and lateral conveyors adjacent the transfer point from said lateral conveyor onto said main line conveyor, for stopping said lateral conveyor when both of said conveyors are loaded with fragmented material and fragmented material is approaching said transfer point, a relay controlled by said switching means associated with said lateral conveyor and connected in a circuit, said switching means associated with said lateral conveyor being connected in a circuit for weakening the field of said main line conveyor motor to increase the speed thereof when said main line conveyor is loaded adjacent said transfer point and said lateral conveyor has been stopped by operation of both of said switching means.

3. In a control system for a plurality of conveyors for fragmented material or the like, a main line conveyor and a lateral conveyor discharging into said main line conveyor, a motor for driving said main line conveyor, a motor for driving said lateral conveyor, a main line conveyor relay for controlling the starting of said main line conveyor motor, a lateral conveyor relay for controlling the starting of said lateral conveyor motor, a control circuit including said lateral conveyor relay for starting said lateral conveyor after said main line conveyor has been started, separate electric switching means associated one each with said main line and lateral conveyors in circuit with said control circuit and controlled by movement of fragmented material along said main line and lateral conveyors adjacent the transfer point from said lateral conveyor onto said main line conveyor, for stopping said lateral conveyor when both of said conveyors are loaded with fragmented material and fragmented material is approaching said transfer point, each of said switching means comprising a photoelectric relay including a source of light adapted to project a beam of light across its associated conveyor onto a photoelectric cell, one of said photoelectric cells being connected in circuit with said lateral conveyor relay for stopping said lateral conveyor when the light beams established on each photoelectric cell are broken, and a relay controlled by the other of said photoelectric cells and connected in said last named circuit for weakening the field of said main line conveyor motor to increase the speed thereof until the fragmented material thereon has moved beyond said transfer point.

4. In a control system for a plurality of conveyors for fragmented material or the like, a main line conveyor and a lateral conveyor discharging into said main line conveyor, a motor for driving said main line conveyor, a motor for driving said lateral conveyor, a main line conveyor relay for controlling the starting of said main line conveyor motor, a lateral conveyor relay for controlling the starting of said lateral conveyor motor, a control circuit including said main line conveyor relay and said lateral conveyor relay for starting said lateral conveyor after said main line conveyor has been started, a plurality of relays in said control circuit, said relays being connected in parallel so either one of said last named relays may be operable to connect said lateral conveyor relay in said control circuit for starting said lateral conveyor after said main line conveyor has been started, electric switching means controlled by movement of fragmented material along said main line conveyor adjacent the transfer point of fragmented material from said lateral conveyor onto said main line conveyor for operating one of said parallel connected relays, electric switching means controlled by movement of fragmented material along said lateral conveyor adjacent the discharge end thereof to operate the other of said parallel connected relays and stop said lateral conveyor when both of said main line and lateral conveyors are loaded, said last named switching means being also operable to control said parallel connected relays to start said lateral conveyor when fragmented material on said main line conveyor has passed the discharge end of said lateral conveyor, and means controlled by operation of the switching means associated with said lateral conveyor for decreasing the field strength of said main line conveyor motor to increase the speed thereof when said lateral conveyor has been stopped by operation of its associated switching means.

5. In an electric control system for a plurality of conveyors for fragmented material, a main line conveyor having a drive motor normally adapted to drive said main line conveyor at slow speed, a lateral conveyor having a drive motor normally adapted to drive said lateral conveyor at slow speed, a field control relay associated with each of said motors, and electric switching means associated with each of said conveyors and controlled by movement of haulage vehicles into discharge position with respect to both of said conveyors to control the fields of said motors to increase the speed thereof while said haulage vehicles are in such discharge position.

6. In an electric control system for a plurality of conveyors for fragmented material, a main line conveyor having a drive motor normally adapted to drive said main line conveyor at slow speed, a lateral conveyor having a drive motor normally adapted to drive said lateral conveyor at slow speed, a field control relay associated with each of said motors, and a photoelectric relay associated with each of said conveyors including a light sensitive cell and a light beam adapted to fall upon said cell, said photoelectric relay being controlled by movement of haulage vehicles into discharge position with respect to both of said conveyors to cut off said light beam to control the field of said motors to increase the speed thereof while said haulage vehicles are in such discharge position.

7. The invention as defined in claim 3 characterized by electrical switching means associated with each of said conveyors and controlled by movement of haulage vehicles into discharge position with respect to both of said conveyors to control the fields of said motors to increase the speed of said conveyors while said haulage vehicles are in such discharge position.

8. The invention as defined in claim 4 characterized by an electrical switching means associated with each of said conveyors and controlled by movement of haulage vehicles into discharge position with respect to both of said conveyors to control the fields of said motors to increase the speed of said conveyors while said haulage vehicles are in such discharge position.

9. The invention as defined in claim 4 characterized by the provision of a photoelectric relay associated with each of said conveyors and including a light sensitive cell and a light beam adapted to fall upon said cell, said photoelectric relay being controlled by movement of haulage vehicles into discharge position with respect to either of said conveyors to cut off said light beam, to control the field of said motors to increase the speed thereof while said haulage vehicle is in such discharge position.

CLAUDE O. WOOD.

REFERENCES CITED

The following references are of record in the file of this patent:

UNITED STATES PATENTS

| Number | Name | Date |
|---|---|---|
| 1,339,486 | Stuart | May 11, 1920 |
| 1,579,545 | Langsdorf | Apr. 6, 1926 |
| 1,922,883 | Crago | Aug. 15, 1933 |
| 2,289,186 | Flint | July 7, 1942 |
| 2,304,447 | Feusier | Dec. 8, 1942 |
| 2,441,469 | Cameron | May 11, 1948 |